June 2, 1964
E. R. GREEN  3,135,311
METHOD AND APPARATUS FOR THE MANUFACTURE
OF LOUVRED CORRUGATED SHEETING
Filed May 17, 1961  3 Sheets-Sheet 1
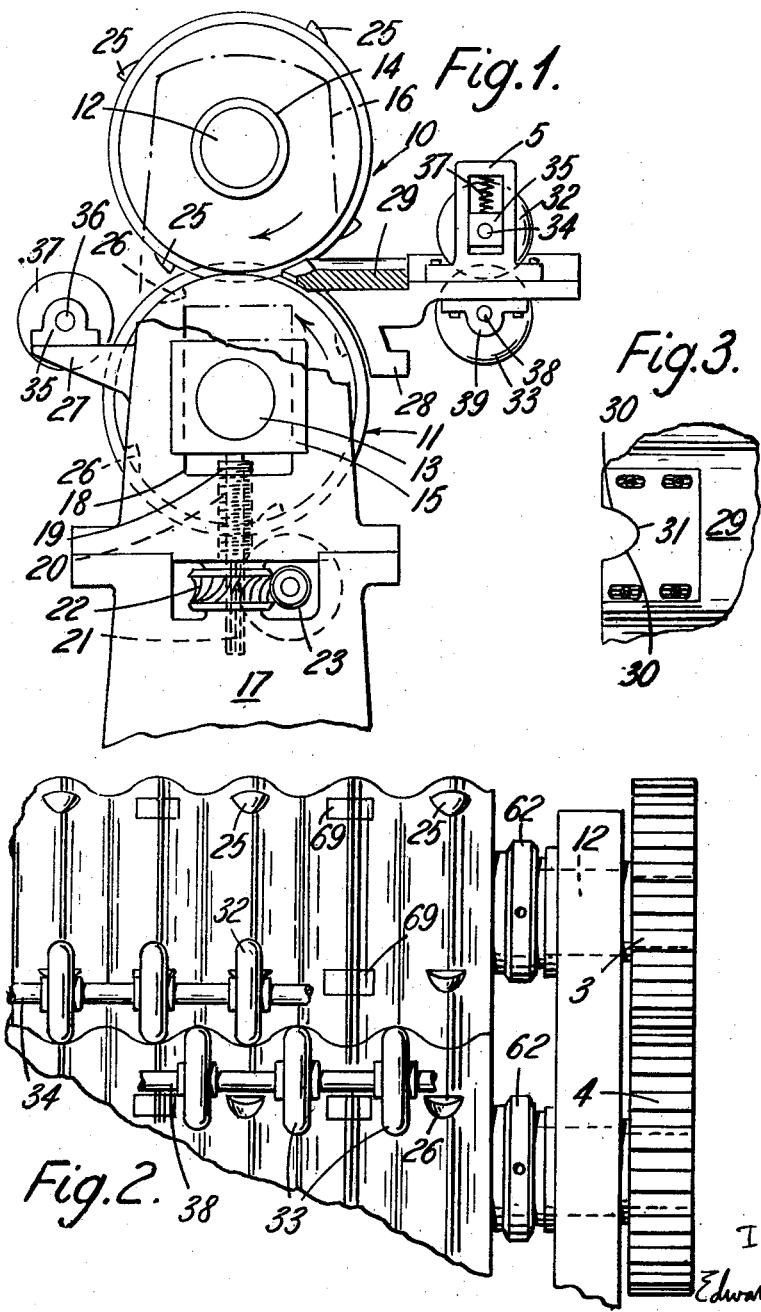
INVENTOR
Edward R. Green
Watson, Cole, Grindle & Watson
ATTORNEYS INVENTOR
Edward R. Green Watson, Cole, Grindle & Watson
ATTORNEYS June 2, 1964
E. R. GREEN
3,135,311
METHOD AND APPARATUS FOR THE MANUFACTURE
OF LOUVRED CORRUGATED SHEETING
Filed May 17, 1961
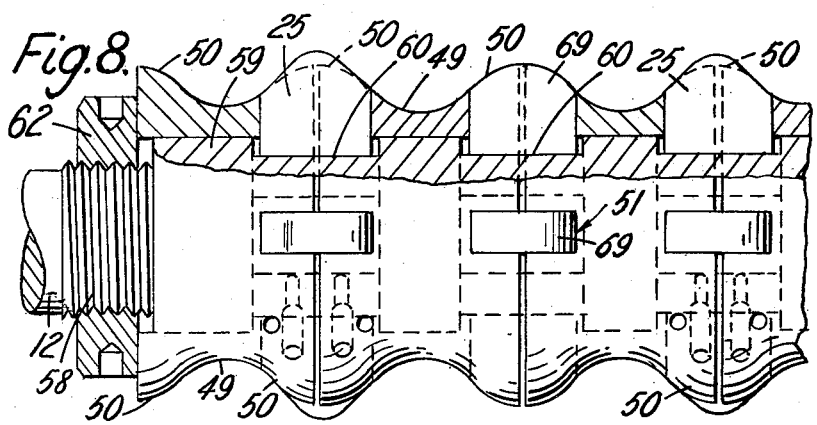
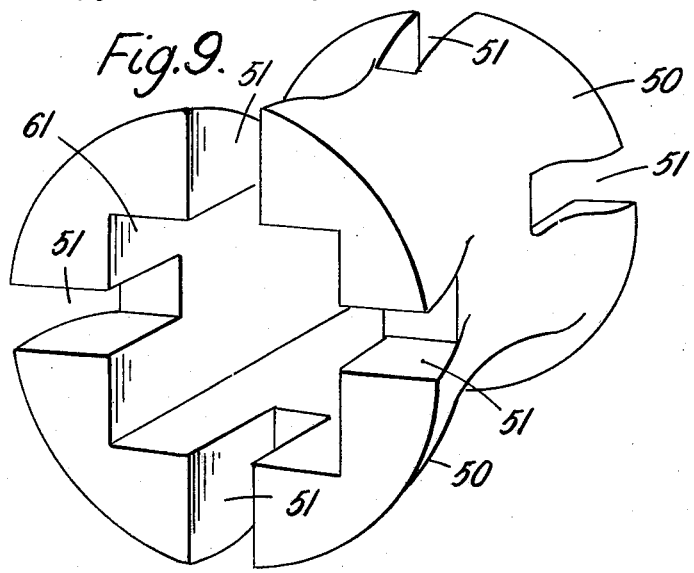
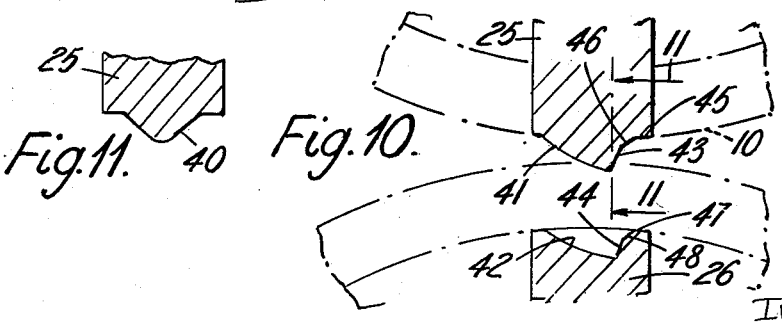
INVENTOR
Edward R. Green
Watson, Cole, Grindle & Watson
ATTORNEYS United States Patent Office 3,135,311
Patented June 2, 1964

3,135,311
METHOD AND APPARATUS FOR THE MANU-
FACTURE OF LOUVRED CORRUGATED
SHEETING
Edward Ramsay Green, London, England, assignor to
Ventrex Roofing Limited, London, England, a company
of Great Britain
Filed May 17, 1961, Ser. No. 110,767
Claims priority, application Great Britain May 19, 1960
19 Claims. (Cl. 153—2)

This invention relates to an improved method and apparatus for the manufacture of louvred corrugated sheeting and particularly metal sheeting of the character set out in British patent specification No. 834,474 and U.S. application No. 388,209, now abandoned.

One of the objects of the invention is to provide an apparatus for forming louvres in continuously moving corrugated sheeting, for example as it issues from a corrugating machine or from a machine which cuts it to the required length thus enabling the apparatus to be employed as a part of or as an adjunct to said machine.

According to this invention a method of manufacturing louvred corrugated sheeting consists in continuously feeding a corrugated sheet past a rotating part carrying a tool or tools which is or are arranged to effect, successively or simultaneously at spaced locations along a crest or valley of each of a number of corrugations, a shearing operation to form a cross cut across each crest and a pressing operation to form a hood-like louvre on one side of the cross cut.

During the shearing operation and/or during the formation of the louvre, a lip may be upset from the edge of the cross-cut which is or is to be formed with the louvre.

The corrugations may be formed in the sheeting in a known manner by feeding a sheet through pairs of rolls which are circumferentially corrugated, in which case the shearing and pressing operations to form the louvres may be carried out during or after the corrugations are formed.

An apparatus for carrying out a method such as is set out above may comprise a driven roll, a shearing tool having one part thereof arranged at each of a number of axially spaced locations on said roll, another part of each of which shearing tools is formed either on a fixed support across which the sheet moves or on a second roll arranged parallel with the first roll and driven in synchronism therewith or on both a part of the support and on said other roll, a press tool either constituted by or combined with the first said part of the shearing tool, at each said location or mounted on a further roll disposed away from the first roll in the direction of travel of the sheet, and which is driven in synchronism therewith, in which latter case a co-operating press tool is mounted at each of a number of locations on a still further roll parallel with and driven in synchronism with the last mentioned roll and means for continuously feeding said sheet past said rolls.

In one form of apparatus one pair only of shearing and pressing rolls is provided and a fixed support extends into the bight between them on the feed side thereof, which support is formed with or has secured thereto said other part of the shearing tool at each of a number of axially spaced locations and said two rolls are provided with cooperating parts of a press tool also at each of a number of axially spaced locations.

In such an apparatus the press tool parts and shearing tool parts may be formed integrally with one another on one of said rolls.

Each combined press tool part and shearing tool part may be shaped so as to have an external surface corresponding to the internal surface of a required hood-like louvre and having a shearing edge bounding an end face corresponding to the mouth of the hood shaped louvre.

The part of each press tool on the other roll may comprise a concavity, the face of which corresponds to the external face of the required hood-like louvre and which concavity has a trocoidal end face. In the case where the hood like louvre, as viewed in side elevation, requires to have a straight inclined summit, the external surface of the press tool part on the first roll is required to be involutely curved around the roll and the face of the concavity on the other roll will likewise require to be curved in the manner of an involute. The obliquity of these involutes will determine the angle of inclination of the louvre with respect to the sheet.

The part of each shearing tool nearest the roll may be formed with an inclined face so as to upset the sheet on one side of the cross cut to form the aforesaid lip.

A part of each shearing tool on said support may comprise a cutting edge, which as viewed in a direction at right angles to the general plane of the sheet is U-shaped with diverging limbs extending in the general direction of the feed of the sheets and which join one another in a rounded apex at the location where the other part of the shearing tool on the roll first engages the sheet.

The edge of the end face of said concavity may be chamfered so as to co-operate with the inclined face at the base of a shearing tool on the first said roll which chamfered and inclined faces together form the aforesaid lip.

In either of the constructions referred to above the support in addition to being formed with the aforesaid part of the shearing tool is shaped to guide the corrugated sheeting through the rolls and there may be likewise provided on the opposite side of the rolls a supporting table for the sheet.

There may also be provided one or more rollers mounted above the table on the feed side and means for yieldingly pressing said roller or rollers towards the table so as to hold the corrugated sheet in close contact therewith and prevent rebound of the sheeting during the shearing and pressing operation, for example, the roller or rollers may be acted upon by spring means or may be gravity loaded.

In either of the arrangements each of the rolls may be circumferentially grooved so as to correspond with the pitch of the corrugations.

Each of the rolls may be made up of a number of rings, the peripheries of which are so shaped that when the rings are held face to face they correspond with the corrugations of the sheeting. There may be formed integrally with each disc on one roll the aforesaid combined press tool and shearing tool and on the rings of the other roll there are formed the aforesaid concavities. Preferably, however, the shearing tools and press tools are formed separately from the rings and detachably secured thereto so as to facilitate regrinding and also so as to enable the tools to be re-arranged according to the required distribution of the louvres on the corrugated sheeting. Thus the rings may be formed from mild steel and tools from tool steel.

Means may be provided for spacing the ring at varying distances apart in accordance with the particular pitch of the corrugations in the sheet being operated upon.

The rolls may be mounted in a conventional type of roll frame providing for vertical adjustment of the upper roll and gearing may be provided between the cooperating rolls so that they are constrained to rotate in opposite directions at equal peripheral velocities.

Only certain of the rings of one roll may be provided with circumferentially spaced projections and these rings are spaced apart by other plain rings according to the number of the corrugations on the sheets which are to be formed with louvres, and the projections on each ring are circumferentially spaced apart according to the pitch of the louvres required along the corrugations.

Instead of the rolls being formed from a number of rings they may be each formed in one part and be provided at a number of locations with recesses or abutment faces to which the tools may be detachably secured.

The following is a description of one form of apparatus according to the invention for forming louvres along the crests of sinuous corrugated metal sheeting reference being made to the accompanying drawings in which:

FIGURE 1 is a diagrammatic side elevation of the apparatus;

FIGURE 2 is a view of a part of the apparatus looking from the right of FIGURE 1, omitting the shearing table and bearing support;

FIGURE 3 is a plan view of a part of the shearing table;

FIGURE 8 is a longitudinal section through one of the rolls;

FIGURE 9 is a perspective view of one of the rings making up a roll;

FIGURE 10 is a section through co-operating parts of the shearing and press tools; FIGURE 11 is a cross-section on the line 11—11 of FIGURE 10.

Figure 12:
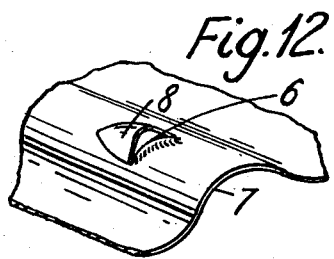
FIGURE 12 is a perspective view of one of the louvres formed by the apparatus on a crest of one of the corrugations.

As shown in FIGURE 12 the apparatus forms an upstanding louvre 8 at each of a number of locations along a crest 7 of each of a number of corrugations and also forms an upstanding lip 6 beneath each louvre. The underside of the crest comprises a valley on the opposite side of the sheet and the apparatus in fact forms each louvre by displacing the metal downwardly from a slit formed in the valley of a corrugation and the following description should be read in the light of this explanation. These operations are carried out by pairs of tools mounted respectively on the crests and in the valley of two co-operating circumferentially grooved rolls indicated generally at 10 and 11 in FIGURE 1. The rolls are secured to shafts or mandrels 12 and 13 respectively, mounted in bearings 14 and 15, carried by a two part stand 16 and 17.

Each bearing 14 is fixed to one of the stands 16 whereas the bearing 15 is vertically adjustable in a slideway 18 in the stand by means of an adjusting screw 19 mounted in a threaded part 20 of the stand. The lower end of screw 19 is feathered or splined at 21 to co-operate with grooves or splines in the worm wheel 22 so that rotation of the latter is transmitted to the screw 19. The shaft 13 is carried in two such adjustable bearings, namely one at each end of the roll and the bearings may be simultaneously adjusted by a worm 23 which engages the two worm wheels 22 associated with the bearings in each end frame.

As explained later each of the rolls is made up of a number of mild steel rings clamped side by side on non-circular parts of the shafts or mandrels 12 and 13 respectively. Certain of the rings on the roll 10 have fixed in them a number of projecting tools shaped both to perform shearing and pressing operations whereas the other roll 11 may carry a number of tool parts in the form of recessed die parts 26 which co-operate with those parts of the other tools which perform the pressing operation.

Formed on or secured to opposite sides of the stand 16 are two pairs of brackets only one bracket of a pair is shown at 27. The other pair of brackets support a beam 28 which spans the two stands. The upper face of the beam is corrugated to correspond to the corrugations of the sheet and has attached to it shearing insets 30, 31. As will be seen in FIGURE 3 each shearing inset 30, 31 is provided with a U-shaped cutting edge opposite the crests of the upper grooved rolls 10 which, as viewed in a direction at right angles to the general plane of the shearing table, are U-shaped with diverging sides 30 extending in the general direction in which the corrugated sheeting is fed and which diverging sides join one another in a rounded apex 31.

The adjustment is applied to the bottom grooved roll 11 so as to maintain a constant relationship between the fixed shearing elements 30, 31 and the tool parts 25. The difference in level between the top of the roll and the table for the range of adjustment will be small and can be accommodated by the flexibility of the corrugated sheet. In an alternative construction the upper roll 10 is adjustable in an up and down direction and to compensate for this movement provision is made for backward and forward adjustment of the shearing table 29.

Mounted also on the beam 28 are pairs of small rollers 32, 33 the former having a spindle 34 mounted in a bearing 35 carried in slideways 36 and spring pressed towards the other roller by a spring 5 one set of these rollers engages alternate valleys of the corrugations on one side of the sheet and the others engage the valleys of the other corrugations on the other side of the sheet. These rollers maintain the sheeting in engagement with the shearing table and prevent it from jumping. The spindle 38 of the other roller is mounted in bearings 39 fixed to the same beam 28.

Each bracket 27 has fixed to it a bearing 35 in which is mounted a further spindle 36 carrying a number of supporting rollers 37 which engage the corrugated sheeting as it leaves the two rolls 10 and 11 and guide it to a location where it is cut to the required lengths.

The two shafts 12 and 13 have fixed to them meshing gear wheels 3, 4 and one of the shafts is driven by a motor or through a transmission from a rotating part of the apparatus which is forming the corrugated sheeting thus the two rolls 10 and 11 are driven in synchronism and the tool parts are maintained in the required operating relationship. The corrugated sheeting thus passes between the rollers 32, 33 over the shearing table 29 into the bight between the two rollers 10 and 11.

The shape of the two tool parts is best shown in FIGURE 10 and FIGURE 11. The curved surface of the projecting part of the tool 25 in section in a plane parallel to the axis of the roll as seen in FIGURE 11 corresponds to the shape 40 of the internal surface of the louvre which is to be formed whereas in cross section in a plane transverse to the axis of rotation of the roll the curved surface as indicated at 41 is an involute and similarly curved surface of the cavity in the other tool part 26 in first said section is also curved in a similar manner to the curve on the outside of the louvre and in the other section comprises an involute curve 42. The end faces 43, 44 of the projecting portion of each tool 25 and of the recessed portion of each tool 26 are trocoids.

The trocoidal surface 43 in the tool part 25 meets that part 45 of the tool which merges with the roll 10 in a flat lip forming portion 46 and similarly that part of the trocoidal surface 44 which joins the part 47 of the tool which merges with the roll 11 by a flat lip forming portion 48. The obliquity of the involute curves 41, 42 will determine the angle of inclination of the cowl-like hood 8 of the louvre on the crest of the corrugation 7 as shown in FIGURE 12. The aforesaid lip formed by the portions 46, 48 is shown at 6.

The effect of this arrangement is that as the two tool parts 25, 26 rotate towards one another the tool part 25 first co-operates with the U-shaped cutting edge on the shearing inset 30, 31 and the edge between the trocoidal portion 43, and curved portion 40, 41 first pierces the sheet and then since the sheet is being drawn across, the corrugated beam 28 and insets 30, 31 by the rolls 10 and 11 continued rotation of those rolls form a comparatively straight cut across the valley of the corrugation and further rotation of the roller causes the projecting tool part 40, 41 to enter into the recess 42 of the tool part 26 and the two involute curved portions 41, 42 roll upon one another and press the metal on one side of the aforesaid slit into a hood-like louvre and also form the lip 6 on the metal on the other side of the slit.

As best seen in FIGURES 8 and 9 each roll is made up of a number of rings each having a circumferential groove 49 of rounded contour which merges on each side thereof with a convexly curved portion 50.

When the rings abut one another the roll, in longitudinal section is bounded in sinuous curves corresponding with the sinuous corrugated sheeting to be formed with the louvres. Each side face of each ring as best seen in FIGURE 9 is provided with four slots 51 adjacent slots being arranged at right angles to one another and extending radially outwards from a bore 61 and which extend axially for such a distance as to terminate short of the bottom of the circumferential groove 49.

The shaft or mandrel 12 adjacent each bearing is externally threaded at 58 (FIGURE 8) and is provided with enlargements 59 spaced apart along the length of the shaft by reduced portions 60. The cross section through the enlargement and through the recesses are polygonal, a number of faces being chosen in accordance with the number of projecting tools which are required around each ring which determines the pitch of the louvres.

Figure 4:
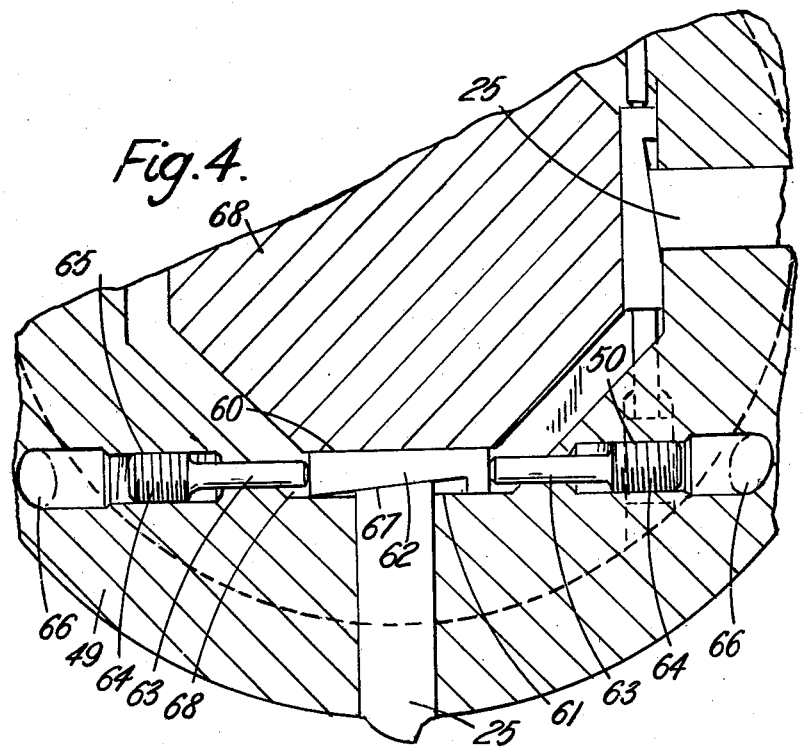
FIGURE 4 is a cross-section through one of the rings making up a roll of the rolls and through a mandrel on which the rings are mounted.
Figure 6:
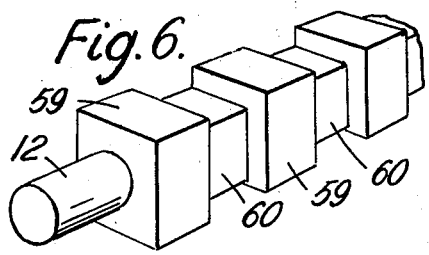
FIGURE 6 is a perspective view of an alternative form of mandrel to that shown in FIGURE 4.
Figure 7:
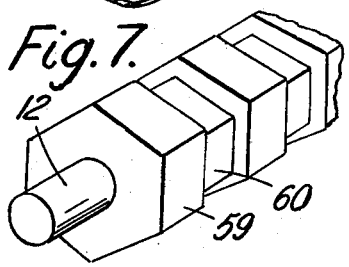
FIGURE 7 is a similar view to FIGURES 5 or 6 of yet a further form of mandrel.
Figure 5:
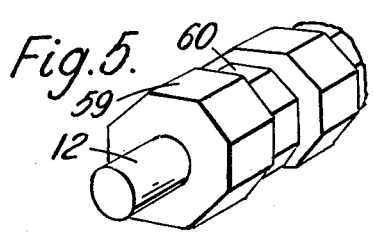
FIGURE 5 is a prespective view of the mandrel shown in FIGURE 4.

In FIGURES 6, 8 and 9 the cross sections through the enlargements on the shaft and through recesses are square, in FIGURES 4 and 5 the cross section is octagonal and in FIGURE 7 it is hexagonal.

The shape of the bore 61 in each ring is selected in accordance with the shape of the enlargement 59 which it is to engage.

As will be seen from FIGURE 8 the rings abut one another at localities opposite the reduced portions 60 of the shaft 12 and the co-operating slots 51 form rectangular sockets into which the tool parts 25 fit. The width across the tool parts 25 is slightly greater than the combined axial width of the slots 51.

A threaded portion 58 is formed on a shaft 12 at each end thereof and is engaged by a clamping nut 62 so that as the rings are drawn together the tool parts 25 are securely clamped in the sockets.

Adjustment may be required for the tool parts 25 in a radial direction which adjusting means are shown in FIGURE 4 as applied to a ring having an octagonal bore arranged for assemblage on a shaft having octagonal section enlarged portions and reduced portions.

The section shown in FIGURE 4 is taken in a plane passing through one of the reduced portions 60 of the shaft or mandrel and thus there is a gap 63 between this reduced portion and a flat portion of the bore 61 in the ring. Located in this gap is a wedge shaped member 62 which is slidable transversely to the axis of the ring and its ends are engaged by the ends of adjusting members 63 provided with enlarged externally threaded heads 64 which engage threaded holes 65 in the ring and which holes have enlarged portions 66 which break into the circumferential groove 49 in the ring. The inner end of each tool part 25 is formed with a face 67 inclined to the longitudinal axis of the tool part and thus transverse movement of the wedge member 62 imparted by manipulation of the screws 64 adjusts the extent of radial projection of the tool part 25 to the required amount. The tool part 26 may be similarly mounted in the rings making up the roll 11.

In the case where the louvres are not required to be formed on every one of the crests of the corrugations certain of the rectangular sockets formed by the slots 51 may be filled by filling pieces 69.

In certain instances it may be possible to use the same assemblage of rings for operating upon corrugated sheets having slightly different pitches for the corrugations.

Instead of the rolls being formed from a number of rings they may each be formed in one part and may be provided, at a number of locations, with sockets or abutment faces for detachably securing the tools.

In an alternative construction in which the shearing and pressing operations are carried out by two separate pairs of rolls, there may be provided at each of a number of axially spaced locations on one roll of the pair, through which the sheet first passes, a comparatively shallow projection of a height slightly greater than the thickness of the sheet to be sheared, whereas at each of a number of axially spaced locations on the co-operating roll has formed on it a co-operating shearing edge.

As in the construction last described the base of the shearing edge on the projection adjacent the roll may be provided with an inclined face, whereas the shearing edge on the other roll may be chamfered, so that during the shearing operation the upstanding lip is formed on the sheet to one side of the cross cut and the other two rolls are provided respectively with a male portion and a female portion of a press tool spaced in accordance with the required shape of the hood-like louvre but curved involutely as in the first construction, should a straight inclined summit of a louvre be required.

Instead of the aforesaid lip being formed during the shearing operation by the inclined and chamfered faces of the shearing members, it is preferably formed at the end of the pressing operation carried out by the second pair of rolls by providing the base of the end face of the male portion of the press tool and the edge of the female portion of the press tool with inclined faces.

In any of the arrangements referred to above, should the corrugated sheeting be required to be passed through the apparatus at a slower rate than that at which it issues from the corrugating machine, a number of the louvre forming apparatus may be provided and arranged to receive the corrugted sheets after they have been cut to the required length, means being associated with the cutting apparatus for cyclically diverting the sheets to the various louvre forming apparatus.

I claim:

1. A method of manufacturing louvred corrugated sheeting which consists in continuously feeding a corrugated sheet between a fixed support and a rotating part carrying at least one tool which support and tool are arranged to shear the material of the sheet to form a slit transversely to the direction of travel of the sheet across a corrugation and which sheet is then moved between rotating parts each formed with at least one tool which tools on the rotating parts co-operate with one another to press material from one side of the slit to form a hood-like louvre.

2. A method according to claim 1 wherein during the formation of the louvre a lip is upset from that edge of the slit opposite to that formed with the louvre.

3. A method according to claim 1 wherein the corrugations are formed in the sheeting in known manner by feeding a sheet through pairs of rolls which are circumferentially corrugated, in which case the shearing and pressing operations to form the louvres is carried out while the corrugations are formed.

4. A method according to claim 1 wherein the corrugations are formed in the sheeting in known manner by feeding a sheet through a pair of rolls which are circumferentially corrugated and wherein the shearing and pressing operations to form the louvres are carried out after the corrugations are formed.

5. An apparatus for manufacturing louvred corrugated sheeting comprising means for feeding the sheeting through the apparatus, a rotatable shearing roll having shearing tools spaced axially apart in accordance with the pitch of the corrugations, a fixed part having correspondingly spaced shearing tools for co-operation with the first said tools to form slits extending transversely to the direction of feed of the sheeting and extending across the corrugations and apposed rotatable rolls formed with co-operating press tools spaced apart in a similar manner to the shearing tools and shaped to form a hood-like louvre on one side of each slit formed by the shearing tool.

6. An apparatus according to claim 5 wherein said press tools on said rolls are so formed as to complete the shearing of the slits in addition to pressing out the hood-like louvres on one side of the slits.

7. An apparatus according to claim 6 wherein the tools on one of said rolls are arranged to co-operate with the shearing tools on the fixed support so as partly to form said slits which are completed by co-operation of the tools on the two rolls.

8. An apparatus according to claim 7 wherein one pair only of shearing and pressing rolls is provided and a fixed support extends into the bight between them on the feed side thereof, which support is formed with or has secured thereto parts of the shearing tools at each of a number of axially spaced locations and said two rolls are provided with co-operating parts of a press tool also at each of a number of axially spaced locations corresponding to the first said location.

9. An apparatus according to claim 8 wherein the press tool parts and shearing tool parts are formed integrally with one another on one of said rolls.

10. An apparatus according to claim 9 wherein each combined press tool part and shearing tool part on one roll is shaped so as to have an external surface corresponding to the internal surface of a required hood-like louvre and having a shearing edge bounding an end face corresponding to the mouth of the hood-shaped louvre.

11. An apparatus according to claim 10 wherein the part of each press tool on the other roll comprises a concavity the face of which corresponds to the external face of the required hood-like louvre and which concavity has a trocoidal end face.

12. An apparatus according to claim 11 and for producing a hood-like louvre which as viewed in side elevation has a straight inclined summit wherein the external surface of the press tool part in the first roll is involutely curved around the roll and the face of the concavity on the roll is likewise required to be curved in the manner of an involute.

13. An apparatus according to claim 5 wherein the part of each shearing tool nearest the roll which carries it is formed with an inclined face so as to upset the sheet on one side of the cross-cut to form the aforesaid lip.

14. An apparatus according to claim 13 wherein the end face of the concavity is chamfered so as to co-operate with the inclined face at the base of the shearing tool on the first said roll, which chamfered inclined faces together form the aforesaid lip.

15. An apparatus according to claim 5 wherein a part of each shearing tool on said support comprises a cutting edge which is as viewed in the direction at right angles to the general plane of the sheet is U-shaped with diverging limbs extending in the general direction of the feed of the sheets and which join one another in a rounded apex at the location where the other part of the shearing tool on the roll first engages the sheet.

16. An apparatus according to claim 5 wherein the support in addition to being formed with the aforesaid part of the shearing tool is shaped to guide the corrugated sheeting through the rolls and there may be likewise provided on the opposite side of the rolls a supporting table for the sheet.

17. An apparatus according to claim 16 wherein there is provided one or more rollers mounted above the support on the feed side and means for yieldingly pressing said roller or rollers towards the support so as to hold the corrugated sheets in close contact therewith and prevent rebound of the sheeting during the shearing and pressing operation.

18. An apparatus according to claim 17 wherein each of the rolls is made up of a number of discs or rings the peripheries of which are so shaped that when the discs or rings are held face to face they correspond with the corrugations of the sheeting which discs are provided with slots which when the discs are clamped together they form sockets in which separate tools are clamped.

19. An apparatus according to claim 18 wherein means are provided at the inner ends of the slots for adjusting the tools in a radial direction.

References Cited in the file of this patent

UNITED STATES PATENTS

| | | |
|---|---|---|
| 717,049 | Stopes | Dec. 30, 1902 |
| 997,946 | Bair | July 18, 1911 |
| 1,295,769 | Kux | Feb. 25, 1919 |
| 1,313,809 | Gare | Aug. 19, 1919 |
| 1,793,352 | Bell | Feb. 17, 1931 |
| 1,890,077 | Elting | Dec. 6, 1932 |
| 3,059,685 | Behlen | Oct. 23, 1962 |